United States Patent [19]

Loose

[11] 4,041,547

[45] Aug. 9, 1977

[54] CONNECTOR SYSTEM FOR CONNECTING TOGETHER TERMINAL POSTS ARRANGED IN TWO MATRICES WHOSE ROWS AND COLUMNS ARE INTERLEAVED

[75] Inventor: Winfield Warren Loose, Linglestown, Pa.

[73] Assignee: AMP Incorporated, Harrisburg, Pa.

[21] Appl. No.: 735,488

[22] Filed: Oct. 26, 1976

Related U.S. Application Data

[63] Continuation of Ser. No. 588,271, June 18, 1975, abandoned.

[51] Int. Cl.$^2$ .............................................. H05K 1/04
[52] U.S. Cl. .................................. 361/410; 339/18 C
[58] Field of Search ............ 361/410; 339/18 R, 18 C, 339/19; 179/98

[56] References Cited

U.S. PATENT DOCUMENTS 3,838,317  9/1974  Coyne .................................... 339/18

Primary Examiner—David Smith, Jr.

Attorney, Agent, or Firm—William J. Keating; Donald W. Phillion

[57] ABSTRACT

A connector system for connecting together selectable pairs of terminal posts from two matrices of pairs of terminal posts mounted upon a common substrate and in which the columns and rows are interleaved. A first type connector housing configuration is employed to connect together a given pair of posts from a given row in a first matrix to a second adjacent pair of posts in the adjacent row of the second matrix. A second type connector having a second configuration is employed to connect a first pair of posts, such as said given pair of posts, to a third pair of posts which are adjacent said second pair of posts in said adjacent row of said second matrix. The configurations of the housing envelope of said first and second type connectors are constructed to fit together, side-by-side, in whatever arrangement they are placed on the post matrices to be able to cover substantially the entire surface of said substrate, thereby obtaining the maximum size and strength for said connector housings for the densely populated matrices of terminal posts.

3 Claims, 8 Drawing Figures

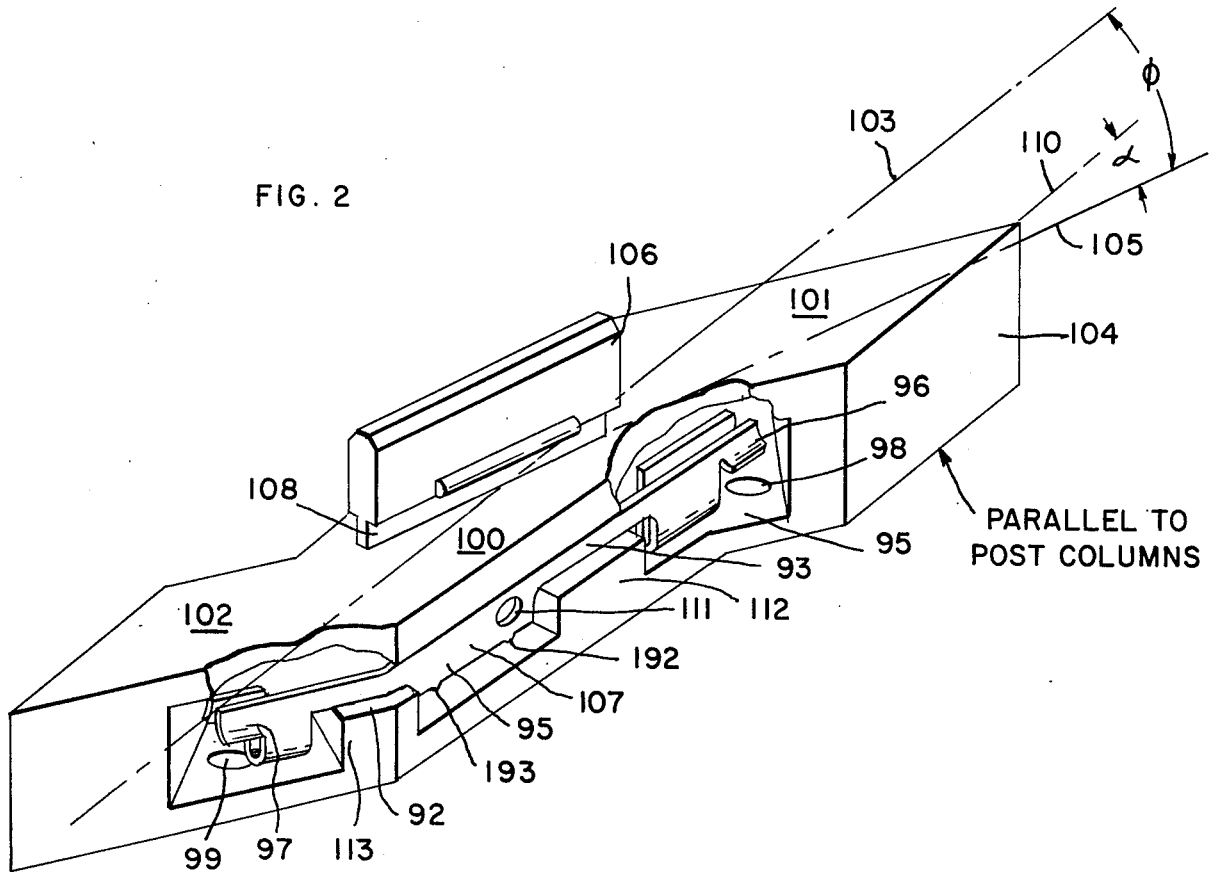

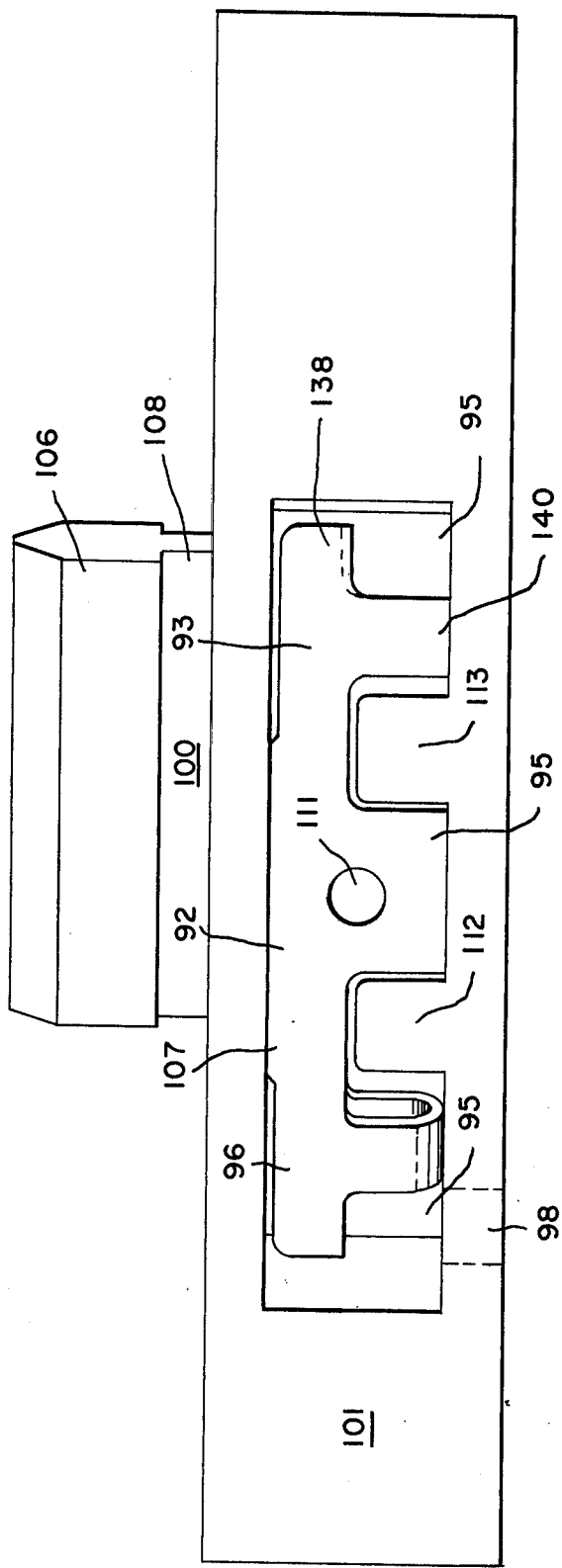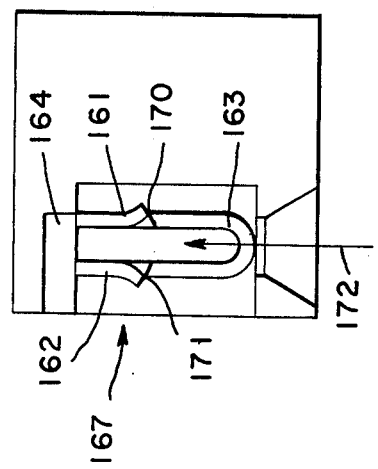

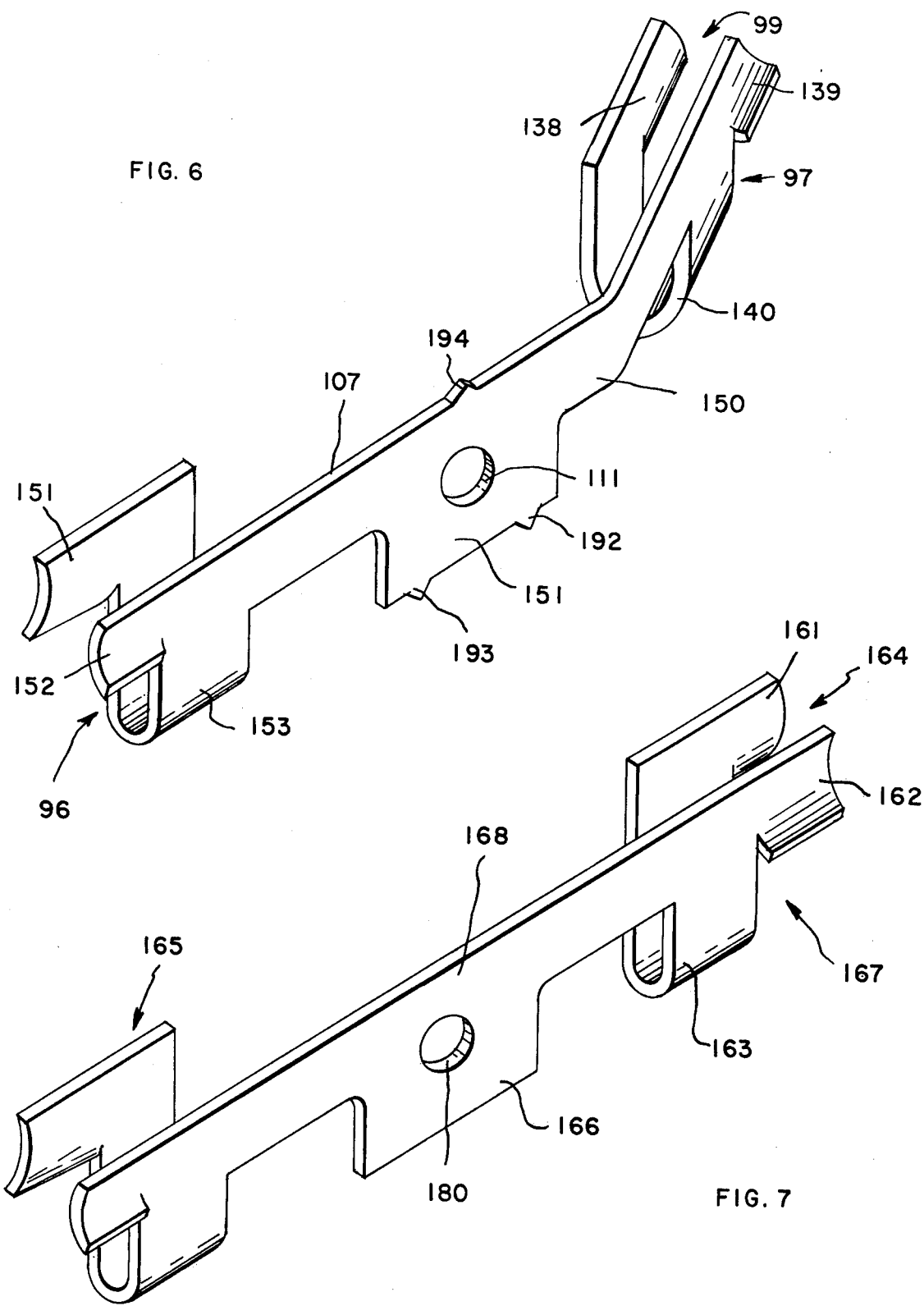

CONNECTOR SYSTEM FOR CONNECTING TOGETHER TERMINAL POSTS ARRANGED IN TWO MATRICES WHOSE ROWS AND COLUMNS ARE INTERLEAVED

CROSS-REFERENCE TO RELATED APPLICATION

This application is a continuation of application Ser. No. 588,271 filed June 18, 1975, now abandoned, by Winfield Warren Loose and entitled "Connector System For Connecting Together Terminal Posts Arranged In Two Matrices Whose Rows And Columns Are Interleaved".

BACKGROUND OF THE INVENTION

This invention relates generally to connectors for connecting together pairs of terminal posts and more particularly it relates to relatively small connectors for connecting together densely populated pairs of terminal posts, one pair being positioned in a first matrix of a pair of terminal posts, and the other pair being positioned in a second matrix of pairs of terminal posts, with the columns and rows of pairs of terminal posts of the two matrices being interleaved.

In electronic systems, particularly those involving switching or the connecting of one of a plurality of lines to one of a second plurality of lines, matrices are frequently employed. One plurality of lines can be considered parallel to the X axis in a rectangular coordinate system and the other plurality of lines can be considered to be parallel to the Y axis. The most direct way to connect any of the first plurality of lines to any of the second plurality of lines is to make a connection at the intersection of said two lines.

In some applications such connections are relatively temporary, as for example, when one subscriber (a transmitting station) in a telephone system dials a number and thereby makes a connection with a second subscriber (a receiving station) in the system. In other applications the connections at the intersection points of the matrix are more permanent, as for example, when a given subscriber's station is assigned a given dialing number which, when dialed, will energize that particular station.

At the risk of over-simplification assume that a particular station is to be connected to a given line in one of the Y coordinates. By excitation of a predetermined pattern of X lines, the given Y line can be caused to respond thereto to ring the telephone assigned to the said given Y line. To change the dial address of a given telephone station it has been necessary in the past for a technician to manually rewire the X oriented lines to conform to the new dialing address.

To eliminate the relatively lengthy and expensive procedure of manually rewiring the switching equipment, a new system for making such changes in electrical connection has been developed. The new system includes a plurality of terminal posts mounted upon a substrate and arranged in an orderly array so that each terminal post can be located by rectangular coordinate definition. Connector means are employed to connect together predetermined ones of said terminal posts in order to make a connection between an X oriented line and a Y oriented line in the electrical matrix system.

Certain physical problems are present, however, in making the actual connection between an X and a Y line at the point where they physically cross each other, as for example, on opposite sides of a substrate board. Moreover, it is necessary in the telephone art to connect together the terminal posts of two pairs of terminal posts, that is a first post of a first pair of terminal posts must be connected to a first post of a second pair of terminal posts, and the second terminal post of the first pair of posts must be connected to the second post of the second pair of terminal posts in order to complete the connection at a given matrix point. Each X line and each Y line is, in fact, a pair of conductors, thereby necessitating the connecting together of two pairs of terminal posts in order to connect together a given electrical matrix point.

A particular relation between the position of the pairs of terminal posts mounted in the substrate and the pairs of X and Y oriented conductors has been devised to permit a near optimum grouping of connections between pairs of pins on said substrate. Specifically, the pairs of pins are arranged on the substrate in two separate matrices, each consisting of columns and rows which are rotated approximately 45° from the Y and X axes of the electrical matrix determined by the X and Y oriented lines between the pins of the posts mounted on the substrate.

The columns and rows of the two matrices of pairs of pins are both interleaved, with each intersection point of each matrix containing two terminal posts arranged in parallel alignment with the columns. A pair of terminal posts of the first matrix is connected to every other pair of Y oriented lines in the electrical matrix along any given X coordinate on a first side of said substrate, while a pair of terminal posts of the second matrix is connected to every other pair of X oriented lines in the electrical matrix along any given Y coordinate on the second side of said substrate.

Thus, for example, to connect any given Y oriented pair of lines to any given X oriented pair of lines, it is necessary to make a connection between the two terminal posts located at one electrical coordinate intersection point to the two terminal posts located at a second electrical coordinate point, since at no intersection of the electrical matrix system are there terminal posts connected to both X and Y oriented pairs of lines. For the same reason more than one type connector is required in order to connect any given X or Y oriented pair of lines to any given Y or X oriented pair of lines. More specifically, since the pairs of terminal posts connected to the X oriented pairs of lines or to the Y oriented pairs of lines occur only at every other pair of X or Y oriented pairs of lines in the electrical coordinate system, a first connector with a given configuration can connect a given pair of terminal posts connected to a pair of lines of a first electrical orientation to every other pair of lines of the other electrical orientation. Accordingly, a second connector having a second configuration is required to connect said given pair of posts to any of the remaining alternate pairs of lines of said other electrical orientation.

Because of the dense population of terminal posts on a substrate, the physical size of the connectors must be quite small. Accordingly, as much of the available space of the substrate surface as possible should be occupied by the connector housings in order to make the connectors as large as possible for purposes of physical strength and reliability. In fact, it is desirable that the connector housings be configured so that the sidewalls of each connector housing abut against, or are very close to, portions of the sidewalls of the adjacent connector housings.

Furthermore, it is desirable that the two types of connector housings be configured so that they can be located precisely in one of the two matrices of pairs of posts and further, has means thereon by which it can be physically gripped by automated equipment and either removed from a given location on the substrate or alternatively, be installed in any given and available location on the substrate.

BRIEF STATEMENT OF THE INVENTION

It is a primary object of the invention to provide a connector system for connecting a pair of posts at a given intersection point in a given row of a first matrix of pairs of posts to a second pair of posts at an adjacent intersection point in the adjacent row of the second matrix of posts or, alternatively, to the pair of posts positioned next to said adjacent pair of posts in said adjacent row of said second matrix.

It is a second purpose of the invention to provide a connector system comprising first and second type connectors for connecting a first pair of posts in a given row of a first matrix of pairs of posts to either of two adjacent pairs of posts lying side-by-side in the row of the second matrix of posts which is adjacent said first row.

A third aim of the invention is a reliable connector system involving first and second type connectors of small size for interconnecting adjacent or next to adjacent pairs of posts from two interleaved matrices of pairs of posts and in which all of said connectors can be located by rectangular coordinates, and which have means thereon for automatic removal or insertion by automated equipment capable of locating any given connector position in said rectangular coordinate arrangement.

A fourth object of the invention is a connector system for interconnecting pairs of terminal posts from two interleaved matrices of pairs of terminal posts with connectors having housing configurations which mate with each other to utilize substantially all of the surface area on the substrate supporting the matrices of posts, thereby providing for maximum connector housing strength, both separately and by mutual support.

A fifth purpose of the invention is a connector system of the type described for connecting terminal posts arranged in matrices of the type described in which each connector position can be located by a rectangular coordinate position and any given connector either removed or inserted at such rectangular coordinate position by automated equipment.

In accordance with one form of the invention there is provided a connector system for use with an array of terminal posts mounted upon a planar substrate and arranged in a pair of matrices which are superimposed upon one another with the columns and rows of the two matrices being interleaved in alternate manner. Each intersection point of each of the two matrices contains a pair of terminal posts aligned with the columns of said matrices.

The connector system comprises first and second type connectors. The first type connector is constructed to connect a pair of terminal posts at a given intersection in the first matrix to an adjacent pair of terminal posts located at an intersection point in the adjacent row of the second matrix. The second type connector is constructed to connect a pair of terminal posts, such as said first pair of terminal posts, in said first matrix to a third pair of terminal posts positioned next to said second pair of terminal posts in the adjacent row of the second matrix of pairs of terminal posts.

The first type connector comprises a housing having a center section extending parallel to said columns of matrices between adjacent rows, and two end sections which extend angularly off the ends of said center section on opposite sides thereof and at a given angle with respect to said columns and which are constructed to cover pairs of terminal posts, such as said first and second pairs of terminal posts mentioned above. The said first type connector housing has cavities formed in the sides thereof constructed to receive and retain contacts inserted therein. Each of these contacts has at both ends thereof a means for engaging a corresponding terminal post of each of said first and second pairs of terminal posts.

The second type connector comprises a substantially straight housing having a generally rectangular cross-sectional configuration with the ends thereof constructed to cover two pairs of terminal posts, such as said pair of terminal posts set forth above. Cavities are formed in both sides of said second type connector housing and each of said cavities is constructed to receive and retain one of said contacts. Each contact is configured to connect together one of the terminal posts of each of said first and third pairs of terminal posts.

In accordance with a feature of the invention the terminal post-engaging portion of each of the contacts comprises a bifurcated section positioned at each end of the contact, with the two legs of each bifurcated section constructed to grip the terminal posts therebetween. The bottom edges, i.e., the edges of the legs of the bifurcated sections which face the surface of the substrate containing the terminal posts, are flared outwardly to guide the terminal posts in-between said legs when the connector is installed upon the substrate surface.

In accordance with another feature of the invention, the second type connector is mounted upon said first and third pairs of contacts with the sidewalls thereof at the same given angle with respect to the alignment of the columns of said matrices as the end sections of the first connector housings. When a first and second type connector housing are mounted side-by-side on a substrate, one angular end section of the first type connector will abut against the side wall of the adjacent second type connector while the other angular end section of said first type connector will be offset, or spaced apart, from the other end of the second type connector, due to the direction of the center section of said first type connector, a distance substantially equal to the width of either an angular end section of the first type connector or the width of a second type connector, both of which widths are equal. Thus, a third connector, which can be either of the first or second type connectors, can have one of its ends cover the pairs of contacts lying in-between the second and third pairs of terminal posts in the space covered by the side-by-side positioned first and second type connectors.

In accordance with still another feature of the invention, each connector housing has formed on the top surface thereof, i.e., the surface farthest away from the substrate, a protuberance or appendage which functions as a handle capable of being securely gripped by appropriate gripping means or jaws of automated equipment, with each of said appendages being precisely positioned with respect to a given rectangular coordinate point of either said first matrix or said second matrix of pairs of terminal posts. Thus, automated gripping equipment capable of locating a given coordinate point in either of said matrices, can be employed to automatically locate any given connector in either matrix and to automatically grip said appendage to remove said connector or, alternatively, to insert a connector in any given coordinate position by means of such handle or appendage.

BRIEF DESCRIPTION OF THE FIGURES

The above-mentioned and other objects and features of the invention will be more fully understood from the following detailed description thereof when read in conjunction with the drawings in which:

FIG. 2 is a perspective view of one of the two types of connectors utilized in the system, with portions thereof broken away to show one of the contacts retained therein;

FIG. 3 is a perspective view of the other type of connector employed in the system, with a portion thereof broken away to show one of the contacts retained therein;

FIG. 5 is a side view of the contacts of FIG. 1 illustrating the typical opening in the sides of the connector housing which receive and retain the contacts;

FIG. 6 is a perspective view of the contact utilized in the structure of FIG. 1;

FIG. 7 is a perspective view of the type contact employed in the connector of FIG. 2; and FIG. 8 is an end view of a contact.

DETAILED DESCRIPTION OF THE INVENTION

Figure 1:
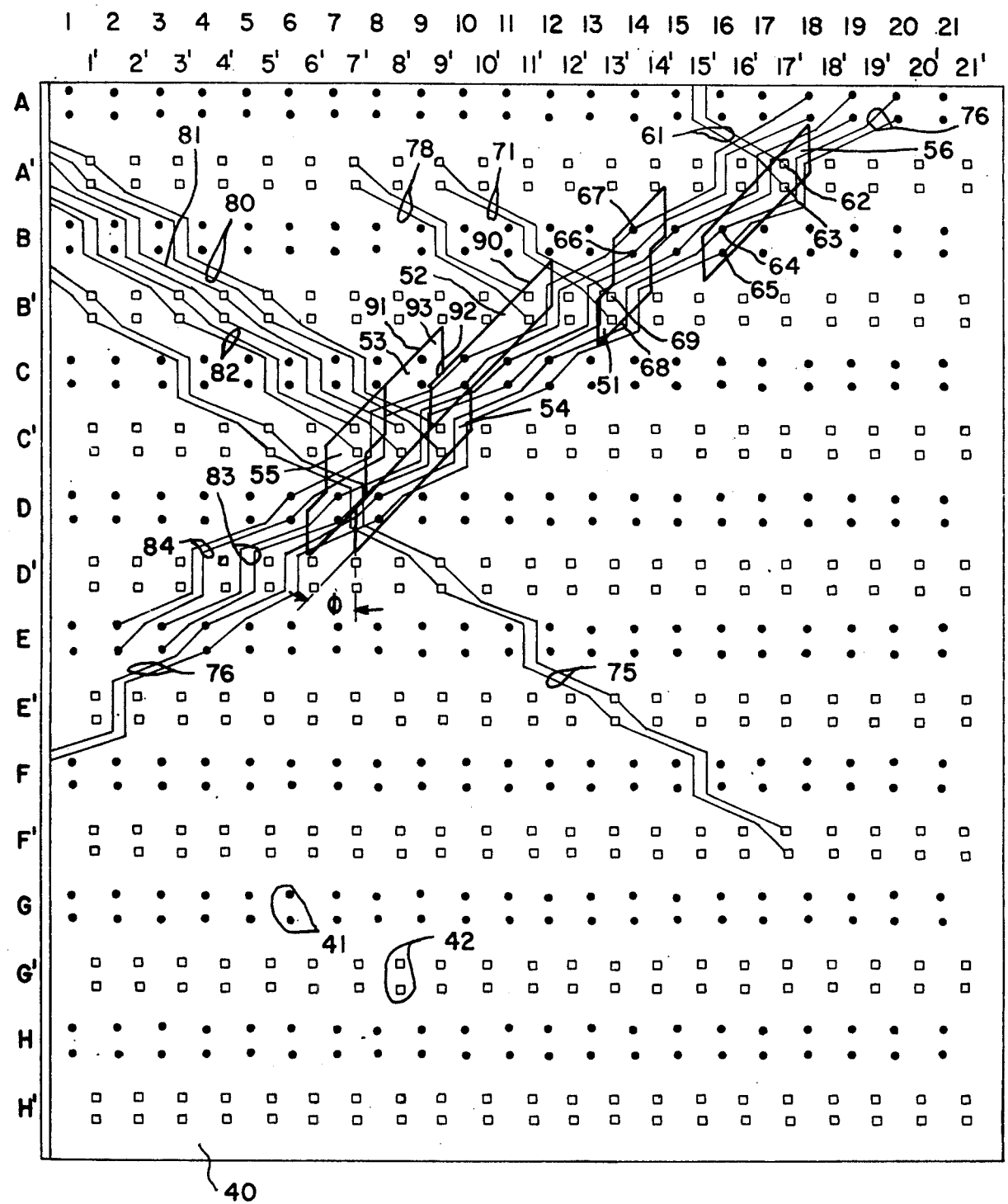
FIG. 1 is a schematic diagram of the two matrices of pairs of posts mounted on a substrate, with the printed circuit paths on the mounting substrate shown, and also the envelopes of various mounted combinations of the two types of connectors illustrating how they interconnect various pairs of terminal posts and also how they interrelate with each other to utilize most of the surface of the substrate.

Referring now specifically to FIG. 1 there is shown a substrate board 40 which, in the preferred embodiment of the invention shown and described herein, is a printed circuit board having two matrices of pairs of terminal posts inserted therein, with the columns and rows of each matrix being interleaved. More specifically, the substrate board 40 is divided into horizontal rows of pairs of circular points and square points, with each circular and square area designating a terminal post extending through the board 40 and substantially perpendicular thereto. The pairs of posts of every odd, alternate row are represented by circular area and define pairs of terminal posts arranged in a rectangular coordinate array. Such odd rows of pairs of terminal posts are designated by the capital, unprimed letters A, B, C, D, E, F, G, and H.

The even rows of pairs of pins are represented by the small rectangular areas and define a second, separate matrix of pairs of terminal posts, also arranged in a rectangular coordinate system. The even rows of pairs of terminal posts are designated by the primed, capital letters A', B', C', D', E', F', G' and H'.

The vertical columns, or rows of pairs of the pins, of the first matrix, which are illustrated as small circular areas, are defined as unprimed columns 1 through 21. The vertical columns of the second matrix of pairs of terminal posts, which are designated by small rectangular areas, are identified as primed columns 1' through 21'. From an examination of FIG. 1 it can be seen that both the rows and the columns of the two separate matrices of terminal posts, designated respectively by small circular areas and small rectangular areas, are interleaved in alternate manner.

As defined above, each matrix point of both matrices consist of two terminal posts, such as for example, the pair of terminal posts 42 or 41. A pair of printed, conductive circuit paths join predetermined posts of the terminal posts in each of the two matrices to form a third matrix, which is an electrical matrix and which, in the preferred embodiment of the invention, is positioned at approximately 90° with respect to the columns and rows of the matrices of pairs of terminal posts.

For example, the pair of conductors 75 join together the pairs of posts of alternate rows of pairs of terminal posts in a first matrix, and extend generally from between the second and fourth quadrants of the terminal post matrices and can be seen to be rotated approximately 45° counter-clockwise from the columns of the terminal post matrices.

To avoid too many lines in FIG. 1 only a few of the pairs of conductors are shown joining together the terminal posts represented by the small rectangular areas. In addition to the pair of lines 75, other such pairs of lines are represented by reference characters 61, 71 and 78, 80, 81 and 82.

Another set of pairs of conductive paths join together the pairs of terminal posts represented by the small circular areas and which lie in alternate rows of FIG. 1, i.e., the rows designated by the unprimed capital letters A through H. More specifically, the pairs of conductors represented by reference characters 76, 83, and 84 join together the pairs of terminal posts represented by the small circular areas in alternate odd rows and extend generally between the first and third quadrants of the rectangular coordinate system represented by the matrix arrays of terminal posts. Accordingly, the pairs of conductive paths join together the pairs of terminal posts represented by the small circular areas extend approximately at right angles to the pairs of conductor paths joining together the pairs of terminal posts represented by the small square areas.

It is again to be noted that for purposes of clarity only a few of the pairs of conductive paths joining together the various pairs of terminal posts represented by the small square and circular areas are shown. Actually, all pairs of terminal posts, both as represented by the small circular areas and the small square areas, are joined together with similar pairs of lines in alternate rows of the matrices of FIG. 4 in the pattern shown by the few pairs of lines actually illustrated in FIG. 1.

It is to be further noted that the first pairs of conductive paths, all extending in one direction, are formed on one side of the substrate or printed circuit board 40, and all of the remaining pairs of conductive paths extending at right angles to said first pairs of conductive paths are printed on the other side of the printed circuit board. Thus, for example, all of the pairs of printed circuit paths joining together the pairs of terminal posts represented by the small circular areas exist on the first side of the board, and all of the pairs of conductive paths joining together the pairs of terminal posts represented by the small square areas are on the second side of the printed circuit board. The terminal posts themselves extend through both sides of the board 40.

The basic reason for the particular arrangement of two pairs of terminal posts with their columns and rows interleaved and with the particular arrangement of the connection of the pairs of conductive leads between alternate rows of the pairs of terminals of each of the two matrices is to enable the most efficient use of the space on the surface of the printed circuit board, in that it permits the most efficient packaging of the connector housings joining together various pairs of terminal posts.

For purposes of clarity, the three matrices, including the two matrices of pairs of terminal posts and the single matrix of pairs of conductive lines will be sometimes described herein as each consisting of a single column or a single row, or a single X and Y oriented line in the case of electrical circuit paths, rather than as pairs of terminal posts or pairs of conductive paths.

Also shown in FIG. 1 are both types of connector housing envelopes employed in the system, as well as how these connector housing envelopes interrelate with each other to form a mosiac or pattern of housings which can cover substantially all of the surface of the printed circuit board 40.

More specifically, the two connector housing envelope configurations are the straight housing configuration denoted generally by reference character 50 in the upper right hand corner of FIG. 1 and the somewhat Z-shaped housing configuration represented by reference character 51 just below and to the left of the straight housing configuration 50.

The straight housing configuration 50 is shown as joining together the pair of rectangularly-shaped terminal posts 62 and 63 in the first matrix to the pair of circularly-shaped terminal posts 64 and 65 in the second terminal post matrix. Thus the connector 51 connects together the pair of conductive paths or lines 61 running from the second to the fourth quadrant to the pair of conductive paths 76 running from the first to the third quadrant in the terminal post rectangular coordinate arrangement. The Z-shaped connector 51 connects together the two square-shaped terminal posts 68 and 69 in the first matrix to the two circular-shaped terminal posts 67 and 68, in the second matrix, thereby connecting together the pair of conductors 71 of the X coordinate electrical system to the pair of conductors 70 in the Y coordinate in the electrical system.

Referring now to the four connector housing envelopes 52, 53, 54, 55 it can be seen how the various shapes of the two different envelopes of connector housings mesh together to cover substantially all of the surface of the board 40, and thereby most efficiently use the space thereon for connecting and switching purposes.

The two Z-shaped housings 53 and 55 fit together by a manner shown to form the equivalent of two straight connectors. Alternatively, the Z-shaped connector 55 and the straight connector housing 54 can fit together to accommodate one end of a Z-shaped connector 53 therebetween. Still another possible arrangement of connector housings is the Z-shaped connector 53 and the straight connector 54 which can be positioned together to accommodate there-in-between the straight connector housing 52.

It can be seen that the Z-shaped connectors, such as connectors 53 and 54, consist of a center section with the end portions thereof extending off the ends of the center portion in opposite directions therefrom and at angles with respect to the columns of posts equal to the same angels the major edges of the straight connector form with said columns. Thus, for example, the edges 91 and 92 of the end portion 93 of Z-shaped connector 53 have an angular relationship with the vertical columns of terminal posts as does the major edge 90 of the straight connector 52.

FIGURE 2

Referring now to FIG. 2 there is shown a perspective view of the Z-shaped connector housing of the system with a portion thereof broken away to show the general configuration of a contact 107 connected therein. The contact 107 has two end portions denoted generally by reference characters 96 and 97 which fit over apertures 98 and 99, respectively, in housing 107. One terminal post from each of a pair of terminal posts from each of the two matrices fit through the holes 98 and 99 in housing 107 and extend upwardly to make contact with the end portions 96 and 97 of contact 107. The details of the end portions and other portions of the contact 107 and its relation to the holes in the housings 98 and 99 of housing 107 will be more fully described hereinafter in connection with the discussion of the structure of FIGS. 4 and 6.

An irregularly shaped and elongated aperture, denoted generally by reference character 95, extends along almost the entire length of one side of the housing 107 to permit insertion of the contact 107 therein. A hole 111 is formed in the contact 107 and is backed by another hole in the housing (not shown in FIG. 2). The hole 111 and the corresponding aligned hole therebehind in housing 107 are for purposes of alignment and assembly of the contact 107 in the connector housing and will be more clearly shown and described in connection with the structure of FIG. 4. At this time let it suffice to state that the elongated cavity 95 in the side of the connector housing of FIG. 2 is constructed to receive and to retain contact 107, with end portions 96 and and 97 poised over the holes 98 and 99 in the connector housing, which holes are positioned to each receive a first terminal pin of a pair of terminal pins in each of the two matrices in the double matrix arrangement of FIG. 1.

The connector housing of FIG. 2 is divided into three sections; a center section 100 which is symmetrical about centerline 103, which centerline is substantially parallel with the columns of the matrices of terminal posts. Extending off each end of center section 100 are two end sections 101 and 102. The two end sections 101 and 102 extend off the housing center section 100 on opposite sides of centerline 103 and at angles designated generally as angle $\phi$ in FIG. 2 and also in FIG. 1. It should be noted that the major sides of the straight type housing, such as shown in FIG. 3 and designated by reference character 50 of FIG. 1, also extends at an angle $\phi$ with respect to the columns of matrices of FIG. 1.

The housing of FIG. 2 also has an appurtenance 106 on the top surface thereof. This appurtenance 106 is in fact a handle with a slot, or some suitable means of gripping 108 formed therein. The said handle 106 is formed vertically on the top surface of housing in a plane substantially at an angle $\alpha$ with respect to centerline 103, i.e., with respect to the vertical columns of the matrices of terminal posts.

The straight housing of FIG. 3 also has formed on the top surface thereof a handle 114 which also has a slot or gripping means 115 formed therein. The said handle 114 is formed vertically on the top surface of the straight housing of FIG. 3 lies in a plane forming an angle α with the vertical columns of the matrices of terminal posts.

Thus, the two handles 106 and 114 in both the Z-shaped and the straight housing configurations of FIGS. 2 and 3 are parallel with each other when connecting together any two pairs of terminal posts on the two matrices formed on the board of FIG. 1.

The housing of FIG. 2 also contains portions 112 and 113 which have a height greater than the height of the remaining slot portions 92 and 93. The purpose of the raised portions 112 and 113 is to facilitate automatic manipulation of the housing of FIG. 2. More specifically, the raised portions 93 and 92 prevent the edge of one housing from slipping into a side slot within which a contact 107 is inserted and thereby causing a fouling of the automatic insertion and extraction equipment used in connection with the connectors of FIGS. 2 and 3.

FIG. 3

Referring now more specifically to FIG. 3 the contact 116 is inserted in a cavity 133 which extends along almost the entire length of each side of the housing 115 of FIG. 3. The contact 116 has end portions 125 and 126 which are poised over holes 119 and 120 in the housing and each of which receives a terminal post from each of two pairs of terminal posts in the two matrices of FIG. 1. An aperture 118 formed in contact 133, is in alignment with a corresponding aperture within housing 115 and is used for purposes of assembling and insertion of contact 116 within cavity 133. The raised portions 127 and 128 in cavity 133 are for the same purposes as the raised portions 113 and 112 of the structure of FIG. 2. More specifically, the raised portions 127 and 128 have a greater height than the heights 129 and 130 of the remaining cavities thereabove, and therefore prevent the housings from becoming snagged or fouled upon one another during insertion or withdrawal thereof from terminal posts on the matrix board of FIG. 1 by automated equipment used for such withdrawal or insertion.

FIGURE 4

Figure 4:
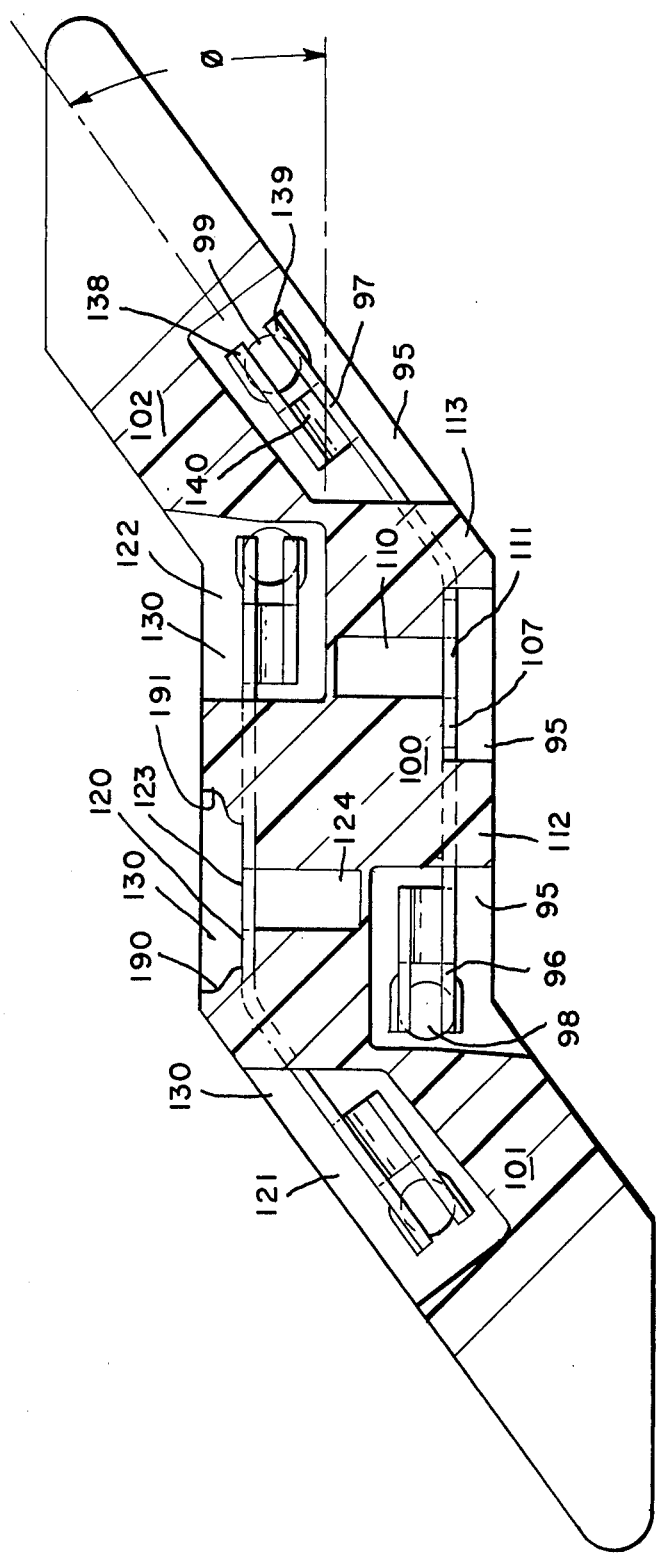
FIG. 4 is a top sectional view of the connector shown in FIG. 2 and illustrates in detail the relationship between the two contacts retained therein and the recesses in the connector housing employed to retain said contacts.

Referring now to FIG. 4 there is shown a cross-sectional view of the top of the structure of FIG. 2. Corresponding portions of the structure of FIG. 4 which correspond to portions of the structure of FIG. 2 are represented by the same reference characters. In FIG. 4 the contact 107 is shown as being inserted within the cavity 95 which extends along the entire lower side of the housing, as shown in FIG. 4. It can also be seen from FIG. 4 that an identical contact 120 but in reversed position, is shown inserted in a slot 130 which extends along almost the entire upper side of the housing of FIG. 4. The end portions 96 and 97 of the contact 107 can be seen to be bifurcated in the view of FIG. 4. More specifically, end portion 97 has two legs 138 and 139 created by the bifurcation of the end portion thereof. Further, there is a U-shaped portion 140 which supports the bifurcated portion 97. The said U-shaped portion 140, which exists at each end of all contacts in both the Z-shaped and the straight housing, can be more clearly seen in the structure of FIG. 6, which is a perspective view of the contacts employed in the Z-shaped type connectors.

As mentioned above, the contact 120 inserted on the upper side of the housing of FIG. 4 is identical to contact 107 except that it has been rotated 180° to fit the slot 130 on the upper side of the housing of FIG. 4. An aperture 123, corresponding to aperture 111 in contact 107, is provided to align contact 120 with the aid of aperture 124 within the housing.

The contacts 120 and 107 can be held in the housing by means of tangs 192, 193 and 194, as shown in FIGS. 2 and 6, or by working the plastic of the housing over the contacts, as shown at 190 and 191 of FIG. 4, which hold contact 120 in the housing.

FIG. 5

Referring now to FIG. 5 there is shown a side view of the structure shown in FIGS. 2 and 4. In FIG. 5, contact 107 can be seen to be inserted within the elongated cavity 95 in one side of the housing, which is divided into a center section 100, and end sections 101 and 102 which are angled off opposite sides of center section 100 by an angle φ, as shown in FIGS. 2 and 4. Also, in FIG. 5, the relationship between the raised sections 112 and 113 and the remaining cavity sections 92 and 93 can be seen more clearly. Further, the position of alignment hole 111 is more evident. The profile of the bifurcated portion 138 of end section 95 and also the supporting U-shaped portion 148 can also be more clearly seen in FIG. 5.

FIG. 6

In FIG. 6 there is shown a perspective view of the contact employed in the Z-shaped connector of FIG. 2. The two end portions 96 and 97 are shown in detail. Consider end portion 96 which has a U-shaped portion 40 formed thereon to support the pair of bifurcated legs 138 and 139 of bifurcated section 99. The contact 107 is bent at an angle φ along line 150 in order to fit within the Z-shaped housing of FIG. 2 and FIG. 4.

The other end portion 96 of the contact 107 in FIG. 6 also has a U-shaped portion 153 formed therein which supports the pair of bifurcated legs 151 and 152, which in turn receive a terminal post therebetween from the board of FIG. 1 and makes electrical contact therewith.

FIG. 7

In FIG. 7 there is shown a perspective view of a typical contact used in the straight type connector housing, which connector is much the same as the bent connector of FIG. 6 except that it is straight. End sections 164 and 165, which extend off each end of connector 168, each comprise a U-shaped section, such as U-shaped section 163. Each of these U-shaped sections supports a bifurcated section, such as bifurcated section 164, which consists of a pair of bifurcated legs 161 and 162. A similar end section 165 exists at the other end of contact 168 of FIG. 7. A portion 166 of the structure of FIG. 7 corresponds to the portion 151 of the contact of FIG. 6 and is positioned in-between raised portions of the housing, such as raised portions 127 and 128 of the structure of FIG. 3. An alignment hole 180 is formed in the contact 168 and is employed in conjunction with a coincident hole in the connector housing, to align and install the contact 168 in the connector housing, as shown in FIG. 3.

FIG. 8

In FIG. 8 there is shown an end view of the end section 167 of FIG. 7. The two legs 161 and 162 of the bifurcated section 164 are supported upon U-shaped section 163. The bottom edges 170 and 171 of legs 161 and 162 are flared outwardly to permit a terminal post mounted in the board of FIG. 1 to enter upwardly in the direction of arrow 172 between the two legs 161 and 162.

It is to be understood that the forms of the invention shown and described herein are but preferred embodiments thereof and that various modifications and changes may be made in the design and details thereof without departing from the spirit and scope of the invention.

I claim:

1. In combination with an array of terminal posts mounted vertically upon a planar substrate and arranged in a pair of matrices superimposed upon one another with the columns and rows thereof being interleaved in alternate manner and with each matrix intersection point in both matrices containing at least two terminal posts, a connector system for selectively and simultaneously connecting first pairs of terminal posts at each of the intersection points in one of said matrices to second or third pairs of terminal posts, respectively, at intersection points located in the adjacent row and the adjacent column, or the column next to said adjacent column, of the other matrix and comprising:

a first connector housing comprising a center section constructed to fit between adjacent rows of pairs of terminal posts and aligned with said columns;

said first connector housing further comprising end sections extending angularly off said center section at opposite ends thereof and on opposite sides thereof to cover one each of said first and second pairs of terminal posts;

first and second contacts;

said first connector housing comprising cavities to receive and retain said first and second contacts;

said first and second contacts each constructed to connect a contact of said first pair of terminal posts individually to a contact of the second pair of terminal posts;

a second connector housing comprising a substantially straight section constructed to have the ends thereof cover said first and third pairs of terminal posts;

third and fourth contacts;

said second connector housing comprising cavities to receive and retain said third and fourth contacts;

said third and fourth contacts each constructed to connect a contact of said first pair of terminal posts, in the absence of another connector being connected thereto, individually to a contact of said third pair of terminal posts;

said first and second housings being configured, when positioned side-by-side in a given row of intersection points to connect two adjacent pairs of terminal posts in said given row to two pairs of terminal posts spaced apart in the row adjacent said given row by a third pair of terminal posts, to space said housings apart a distance to enable another of said housings to fit therebetween and connect said third pair of terminal posts to a pair of terminal posts in a third row adjacent said adjacent row;

each of said contacts comprising a bifurcated terminal post engaging section with the legs of each bifurcation constructed and positioned within said housing to grip one of said terminal posts therebetween;

said legs of each of said bifurcations having the edge thereof which faces the substrate flared outwardly to facilitate entry of said terminal post between said legs of said bifurcation.

2. In combination with an array of terminal posts mounted vertically upon a planar substrate and arranged in a pair of matrices superimposed upon one another with the columns and rows thereof interleaved in alternate manner and with each matrix point in both matrices containing two terminal posts, a connector system comprising first and second type connectors for connecting a first pair of posts in either of said matrices selectively to a second or a third pair of posts at an intersection point located in the adjacent row or the column next to said adjacent column, respectively, of the other matrix:

said first type connector comprising:

a first connector housing comprising a center section constructed to fit between adjacent rows of pairs of terminal posts and in substantial alignment with said columns;

said first connector housing further comprising parallel end sections extending angularly off opposite ends of said center section to cover the two pairs of terminal posts being connected together;

first and second contacts;

cavities formed in both sides of said first connector housing and each constructed to receive and retain one of said contacts;

said first and second contacts each constructed to individually connect one of said first pair of terminal posts to one of said second pair of terminal posts;

said second type connector comprising:

a second connector housing comprising a substantially straight section constructed to cover a first pair of terminals located at a first intersection point of one of said matrices and a third pair of terminals located in the adjacent row and the column next to said adjacent column of said other matrix;

third and fourth contacts;

said second connector housing comprising cavities in the sides thereof to receive and retain said third and fourth contacts;

said third and fourth contacts each constructed to connect one of said first pair of contacts to one of said third pair of terminals;

each of said contacts comprising a bifurcated terminal post engaging section with the legs of each bifurcation constructed and positioned within said housing to engage one of said terminal posts.

3. In combination with an array of densely populated terminal posts mounted vertically upon a planar substrate and physically arranged in a pair of matrices superimposed upon one another with the columns and rows of said matrices being interleaved in alternate manner, and with each intersecting point of each matrix containing two terminal posts aligned with the column in which they are positioned, a connector system comprising first and second connector means;

said first connector means comprising:

a first connector housing;

first and second contacts retained in said first connector housing;

said first connector housing comprising:
- a center section constructed to fit between two adjacent rows of terminal posts along a centerline substantially parallel to the alignment of said matrix columns;
- end sections extending off opposite sides of the centerline of said center section at opposite ends thereof to cover the first and second pairs of terminal posts connected together by said first connector means;
- said first connector housing comprising first cavities of a first configuration formed in both sides thereof with a partition therebetween;
- each of said first cavities constructed to receive and retain one of the contacts of said first and second contacts;
- said first and second contacts constructed to connect first and second terminal posts, respectively, of a first pair of terminal posts of a first given point of intersection in a given row of said first matrix to first and second terminal posts, respectively, of a second pair of terminal posts of a second given point of intersection adjacent said first given point and located in the adjacent row in said second matrix;

said second connector means comprising:
- a second connector housing; and
- third and fourth contacts retained in said second connector housing;

said second connector housing comprising:
- a single, substantially straight section having second cavities of a second configuration formed on both sides thereof with a partition therebetween;
- each of said second cavities constructed to receive and retain one of said third and fourth contacts;
- said third and fourth contacts constructed to connect the first and second terminal posts, respectively, of said first pair of terminal posts, in the absence of another connector being connected thereto, to first and second terminal posts of a third pair of terminal posts located at a point of intersection of said second matrix adjacent said second point of intersection and in the same row thereof;

each of said contacts comprising a bifurcated terminal post engaging section with the legs of each bifurcation constructed and positioned within said housing to frictionally engage one of said terminal posts.

* * * * *